US007163078B2

(12) United States Patent
Moya et al.

(10) Patent No.: US 7,163,078 B2
(45) Date of Patent: Jan. 16, 2007

(54) HYDROSTATIC DRIVE

(75) Inventors: Juan Moya, Horb (DE); Rolf Brockerhoff, Waldachtal (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 496 days.

(21) Appl. No.: 10/471,398

(22) PCT Filed: Jun. 12, 2002

(86) PCT No.: PCT/EP02/06469

§ 371 (c)(1),
(2), (4) Date: Sep. 10, 2003

(87) PCT Pub. No.: WO02/100707

PCT Pub. Date: Dec. 19, 2002

(65) Prior Publication Data

US 2004/0083728 A1    May 6, 2004

(30) Foreign Application Priority Data

Jun. 13, 2001  (DE)  ................ 101 28 589

(51) Int. Cl.
*B60K 17/14*  (2006.01)
(52) U.S. Cl. ................ 180/308; 180/307; 180/305
(58) Field of Classification Search ............. 180/305, 180/307–308; 60/325, 327, 421–422, 426–427, 60/445, 451, 484
See application file for complete search history.

(56) References Cited

U.S. PATENT DOCUMENTS 3,098,574 A * 7/1963 De Marco ................ 414/635
3,481,417 A * 12/1969 Jean et al. ................ 180/6.5
3,795,107 A    3/1974 Ward (Continued)

FOREIGN PATENT DOCUMENTS

EP    0 025 372    3/1981

*Primary Examiner*—Christopher P. Ellis
*Assistant Examiner*—Vaughn Coolman
(74) *Attorney, Agent, or Firm*—Scully, Scott, Murphy & Presser, P.C.

(57) ABSTRACT

The invention relates to a hydrostatic drive comprising at least one hydraulic pump (1) and a first and a second hydraulic motor (6, 25), which are respectively connected to said hydraulic pump (1) by means of two service lines (4, 41, 5, 5') and whose absorption volume can be regulated by means of a regulator (40, 41). One respective hydraulic motor (6, 25) for a drive train is provided per respective right or left vehicle side. The regulators (40, 41) are actuated by a respective regulator piston (7, 26). The regulator pistons (7, 26) of both hydraulic motors (6, 25) can be subjected to a force by means of a common high pressure, which equals the highest pressure that prevails in the service lines (4, 41, 5, 5') of both hydraulic motors (6, 25). Each force is opposed to a respective counter-force, which is generated by a control pressure in a control pressure chamber (11, 11'). The pressure in the control pressure chamber (11)/(11') of the first and second regulator pistons (7)/(27) of the first and second hydraulic motors (6)/(25) can be reduced by means of first and second pressure regulating valves (17)/(30) in relation to a tank (20) and the first and second pressure regulating valves (17)/(30) are impinged by the respectively higher pressure of the first and second service lines (4, 5)/(4', 5') that are allocated to the first and second hydraulic motors (6)/(20), in the form of a controlled variable.

6 Claims, 1 Drawing Sheet

U.S. PATENT DOCUMENTS

Figure 1:
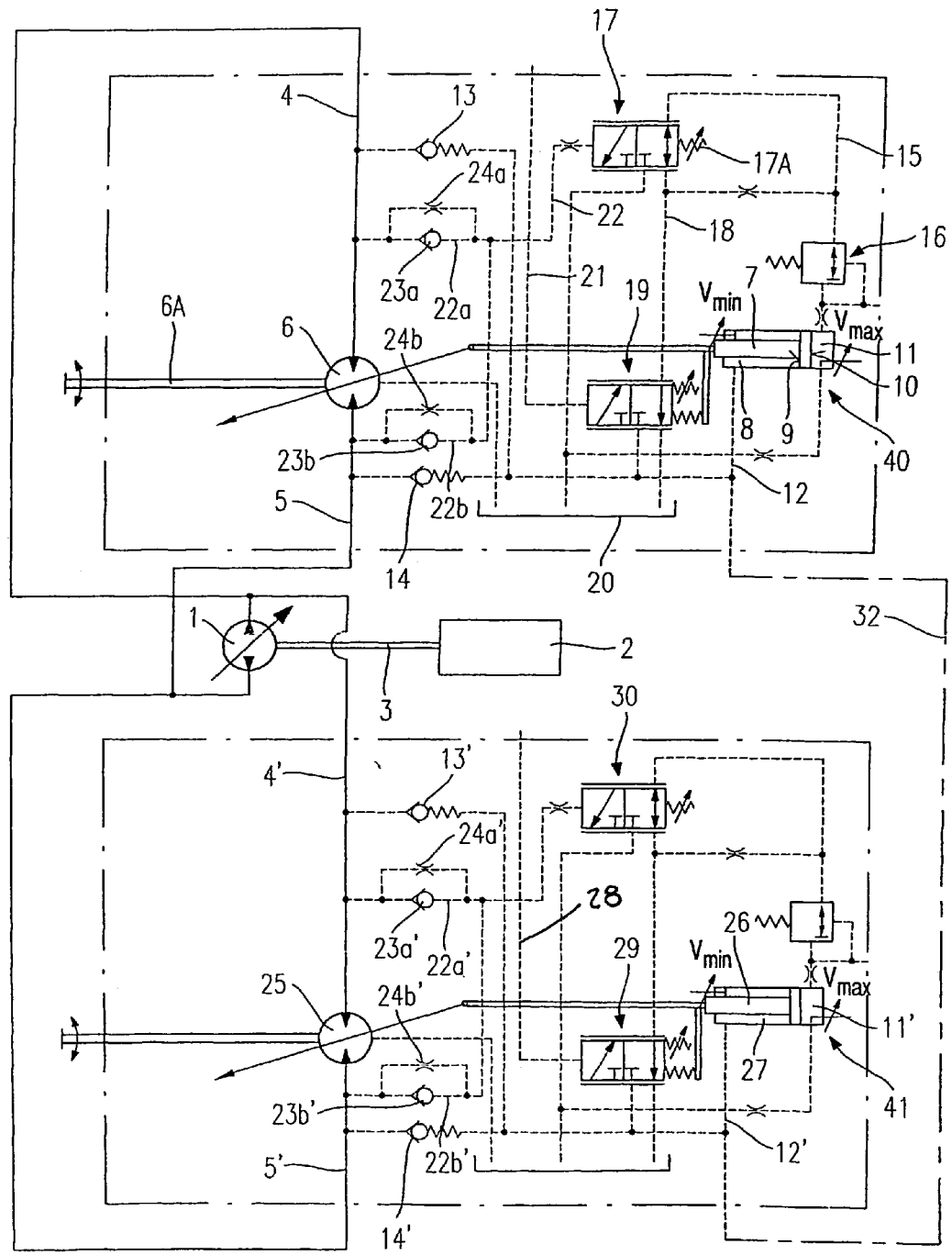

| | | | |
|---|---|---|---|
| 3,887,028 A * | 6/1975 | Goff et al. | 180/406 |
| 4,241,577 A * | 12/1980 | Baldauf | 60/420 |
| 4,395,878 A * | 8/1983 | Morita et al. | 60/427 |
| 4,715,180 A * | 12/1987 | Rosman | 60/372 |
| 4,722,186 A * | 2/1988 | Louis et al. | 60/400 |
| 5,191,950 A * | 3/1993 | Kleineisel et al. | 180/6.3 |
| 5,907,952 A * | 6/1999 | Akasaka et al. | 60/452 |
| 6,622,594 B1 * | 9/2003 | Ikari et al. | 74/733.1 |

* cited by examiner

HYDROSTATIC DRIVE

Hydrostatic drives comprising a plurality of hydraulic motors are known e.g. from EP 0 025 372. A drive motor in said case drives one or more hydrostatic pumps, which may for example take the form of variable axial piston machines, wherein for driving the vehicle at least two hydraulic motors are provided. The hydraulic motors each drive one side of the vehicle. They are likewise designed as variable hydrostatic machines so that, by varying the absorption volume of the hydraulic motor of a vehicle side, cornering or straight-ahead driving is adjustable.

In such drives the hydraulic motors of the right and left vehicle side are synchronized for straight-ahead driving. What is problematic about the synchronously operating hydraulic motors is the common actuating pressure which is used to synchronize the hydraulic motors via actuating devices, which operate separately from one another. In specific driving situations, e.g. in the event of driving resistance while cornering, the regulating device, which produces the desired synchronous operation of the hydraulic motors for straight-ahead driving, forces the pivoting angles of both hydraulic motors to be swivelled in the same direction. The conformation of the absorption volume of the two hydraulic motors, however, causes the vehicle to be deflected from its originally defined cornering line and forces unwanted straight-ahead driving.

The object of the present invention is to provide a hydrostatic drive comprising hydraulic motors, which are synchronized for straight-ahead driving, the regulating device of which hydrostatic drive does not counteract an intended cornering operation upon a change of load.

The object is achieved by the hydrostatic drive according to the invention according to claim 1.

What is advantageous about the hydrostatic drive according to the invention is the non-interaction between the synchronization of the two hydraulic motors and an override device upon a change of the load state and a consequently arising pressure increase in the working lines. For synchronization of the two hydraulic motors, in said case, by means of a synchronization line a hydraulic pressure is used, which is identical for both hydraulic motors and is loaded with the pressure of the adjusting pistons of the adjusting device. For straight-ahead driving the two hydraulic motors are therefore set in synchronous operation. As a controlled variable when cornering under increased load, e.g. while driving uphill, on the other hand, a pressure associated with the hydraulic motor to be adjusted is used to achieve an adjustment of the pivoting angle. The control intervention therefore does not force both hydraulic motors to swivel back in an identical manner and does not lead to a deviation from the intended cornering operation.

Advantageous developments of the hydrostatic drive according to the invention are possible by virtue of the measures outlined in the sub-claims.

An embodiment of a hydrostatic drive according to the invention is illustrated in a simplified manner in the drawing and described below. The drawing shows FIG. 1 a hydraulic circuit diagram of a hydrostatic drive according to the invention having two hydraulic motors.

FIG. 1 diagrammatically illustrates the structure of an embodiment of a hydrostatic drive according to the invention. A hydraulic pump 1 is of an adjustable construction and designed for delivery of a pressure medium in both directions. The hydraulic pump 1 is driven by a drive motor 2, which is connected to the hydraulic pump 1 by a drive shaft 3.

The hydraulic pump 1 is connected by a first working line 4 and a second working line 5 to a first hydraulic motor 6. Depending on the direction of delivery of the hydraulic pump 1 the first and the second working line 4 and 5 act as a discharge-end and/or suction-end working line. The first hydraulic motor 6 is designed e.g. as a hydrostatic axial piston machine with an adjustable pivoting angle. The first hydraulic motor 6 is connected by an output shaft 6a to a drive device of one vehicle side, e.g. to track chains or wheels. The adjusting device of the first hydraulic motor 6 is actuated by means of an adjusting piston 7. For adjustment of the adjusting piston 7 a power difference is produced, which is generated by a pressure, which acts in a high-pressure chamber 8 upon a piston ring area 9 and pushes the adjustment in the direction of a maximum absorption volume $V_{max}$, as well as by an actuating pressure, which acts in the opposite direction upon a piston area 10 in an actuating pressure chamber 11.

The pressurization of the high-pressure chamber 8 is effected via a high-pressure line system 12. The high-pressure line system 12 is connected by a first spring check valve 13 to the first working line 4. The first spring check valve 13 is a spring-preloaded check valve, which opens in the direction of the high-pressure line system 12. The second working line 5 is likewise connected to the high-pressure line system 12 by a second spring check valve 14, which is of an identical construction to the first spring check valve 13. The supply of pressure medium to the actuating pressure chamber 11 is effected via an actuating pressure supply line 15. Disposed in the actuating pressure supply line 15 is a pressure-reducing valve 16, which effects a pressure reduction of the pressure medium to be supplied via a throttle to the actuating pressure chamber 11. The actuating pressure chamber 11 is moreover connected by a further throttling point to a tank 20.

A first pressure regulating valve 17, which is designed as a 3/2-way valve, in its first end position, which is defined as an initial position by the force of an adjustable compression spring 17a, connects an actuating pressure connection line 18 to the actuating pressure supply line 15. In said position flow is possible in both directions through the first pressure regulating valve 17. The actuating pressure connection line 18 and the actuating pressure supply line 15 are moreover connected to one another, parallel to the throughflow valve path, by a throttling device.

Via a first control pressure valve 19 the actuating pressure connection line 18 is moreover relievable in the direction of a tank 20 and so the actuating pressure in the actuating pressure chamber 11 is reducible. In a second end position of the first control pressure valve 19 the high-pressure line system 12 is connected to the actuating pressure connection line 18, so that via the first pressure regulating valve 17 and the actuating pressure supply line 15 the actuating pressure chamber 11 is loadable with the pressure of the high-pressure line system 12. The first control pressure valve 19 is likewise designed as a 3/2-way valve, which is steplessly adjustable between its two end positions. The adjustment of the first control pressure valve 19 is effected by means of a pressure, which is supplied through a control pressure line 21 to a measuring area of the first control pressure valve 19 and is counteracted by a spring force generated by two compression springs, of which one is adjustable. The position of the spring bearings, which are remote from the first control pressure valve 17, is in said case dependent upon the position of the adjusting piston 7, so that the force generated by the control pressure of the first control pressure line 21 at the measuring area of the control pressure valve 17 is counteracted by a variable spring force.

Upon an increase of the pressure in the control pressure line 21, the first control pressure valve 19 is moved in the direction of its second end position. As a result, the high-pressure line system 12 is connected by the first pressure regulating valve 17 and the pressure-reducing valve 16 to the actuating pressure chamber 11 of the adjusting piston 7. The pressure effective in the actuating pressure chamber 11 and in the high-pressure chamber 8 moves the adjusting piston 7 because of the different size of the effective piston areas in the direction of a smaller pivoting angle, i.e. smaller absorption volume $V_{min}$. The movement of the adjusting piston 7 varies the position of the spring bearings, so that the pressure in the control pressure line 21 is counteracted by an increasing spring force. The deflection of the first control pressure valve 19 is reduced, given a constant control pressure, until a state of equilibrium has arisen at the first control pressure valve 19 and the first adjusting piston 7.

For the second vehicle side a system of identical construction is provided, which is shown in the first half of the diagram and in which a second adjustable hydraulic motor 6' is connected to the hydraulic pump 1 by a further first working line 4' and a further second working line 5'.

The two further first and second working lines 4' and 5' are connected by two further spring check valves 13' and 14' to a high-pressure line system 12', wherein the high-pressure line system 12 and the high-pressure line system 12' are connected to one another by a synchronization line 32. In a second high-pressure chamber 27 of the second adjusting piston 26 the same pressure therefore prevails as in the high-pressure chamber 8 of the adjusting piston 7. The connection of the first and second working line 4 and 5 and/or of the further first and further second working line 4' and 5' by check valves 23a and 23b, and/or 23a' and 23b' to the high-pressure line systems 12 and/or 12', which are in turn connected to one another by the synchronization line 32, there prevails in the two high-pressure line systems 12 and 12' an identical pressure, which is equal to the highest of the working pressures prevailing in the four working lines 4, 4', 5 and 5'.

Via a second control pressure line 28 a second control pressure valve 29 is loaded at a measuring area with a second control pressure, wherein the second control pressure valve 29 is of an identical construction to the first control pressure valve 19. For straight-ahead driving an identical control pressure prevails in the control pressure lines 21 and 28. This leads, because of the synchronization line 32 connecting the high-pressure chamber 8 to the second high-pressure chamber 27, to synchronous activation of the first hydraulic motor 6 and the second hydraulic motor 25. The vehicle travels straight ahead.

The above description is based on the assumption that the first pressure regulating valve 17 and a second pressure regulating valve 30 are situated in a first end position. The forces acting upon the adjusting piston 7 and/or the second adjusting piston 26 are therefore regulated by the first control pressure valve 19 and/or the second control pressure valve 29, since in said position the first and second pressure regulating valves 17 and 30 act merely as connection pieces.

The mode of operation and connections of the two pressure regulating valves 17 and 30 are described below with reference to the first pressure regulating valve 17. The function of the second pressure regulating valve 30 is analogous with regard to the second hydraulic motor 25, the further working lines 4' and 5' and the second adjusting piston 26.

The first pressure regulating valve 17 is held in its first end position by an adjustable compression spring 17a. In this first end position it connects the actuating pressure connection line 18 to the actuating pressure supply line 15, wherein flow through the connection is possible in both directions. In the second end position the first pressure regulating valve 17 connects the actuating pressure supply line 15 to the tank 20. The actuating pressure chamber 11 may be relieved in said second end position of the first pressure regulating valve 17. The first pressure regulating valve 17 is steplessly adjustable between said two end positions, wherein for adjusting the valve position the force of the adjustable compression spring 17a is counteracted by a regulating pressure acting upon a measuring area.

The regulating pressure, which is supplied via a throttling point to the measuring area of the first pressure regulating valve 17, is removed from the first or second working line 4 or 5 through a regulating pressure supply line 22, which divides into two parallel portions 22a and 22b. In each of the two parallel portions 22a and 22b a check valve 23a and/or 23b is disposed. Via the two check valves 23a, 23b the first working line 4, and/or the second working line 5 is connected to the regulating pressure supply line 22. Thus, it is always the higher of the two pressures in the first working line 4 and/or the second working line 5 that acts as a regulating pressure upon the measuring area of the first pressure regulating valve 17. For each of the two check valves 23a and 23b a parallel throttling device 24a and/or 24b is provided.

By virtue of the connection of the first pressure regulating valve 17 and/or the second pressure regulating valve 30 by check valves 23a and 23b and/or 23a' and 23b' to the corresponding working lines 4 and 5 and/or 4' and 5', upon an increase of the pressure in the discharge-end working line of the first or second hydraulic motor 6 or 25 the corresponding pressure regulating valve 17 and/or 30 is moved in the direction of its second end position. The actuating pressure is therefore reduced and the adjusting piston 7, owing to the pressure prevailing in the high-pressure chamber 8, is adjusted in the direction of a larger pivoting angle.

If, for cornering, the output speed e.g. of the first hydraulic motor 6 is to be reduced, then in the control pressure line 21 a lower pressure is adjusted than in the second control pressure line 28. The first control pressure valve 19 is therefore adjusted in the direction of its first end position, in which the actuating pressure chamber 11 is relieved into the tank 20. The adjusting piston 7 therefore moves in the direction of a larger pivoting angle, with the result that the output speed is reduced and the output torque increased. The unaltered high pressure in the second control pressure line 28 ensures that the second control pressure valve 29 continues to remain adjusted in the direction of its second end position. The actuating pressure chamber of the second adjusting piston 26 is therefore still pressurized from the second high-pressure line system 12', so that the second adjusting piston 26 continues to remain adjusted in the direction of a smaller pivoting angle. In accordance with the differently adjusted pivoting angles of the first and second hydraulic motors 6 and 25 the vehicle corners.

Following an increase of the driving resistance a pressure increase arises only in the discharge-end working line 4 or 5 of the hydraulic motor 6 having the greater output torque and accordingly effects an activation of the first pressure regulating valve 17 in the direction of its second end position. The second pressure regulating valve 30 connected to the second working lines 4' and 5', on the other hand, does not respond and the pivoting angle of the second hydraulic motor 25 remains set at a small angle. Thus, in a vehicle driven according to the invention the cornering operation may be maintained even when, because of a change in driving resistance, the first or second pressure regulating valve 17 or 30 responds, because the pressure regulating valve 17 or 30 that would lead to unintended straight-ahead driving does not respond.

The invention claimed is:

1. Hydrostatic drive having at least one hydraulic pump (1) and a first and a second hydraulic motor (6, 25), 5 which are each connected by two working lines (4, 4', 5, 5') to the hydraulic pump (1) and the absorption volume of which is adjustable in each case by means of an adjusting device (40, 41), wherein in each case one hydraulic motor (6, 25) is provided for a drive train for in each case a right or a left vehicle side, characterized in that the adjusting devices (40, 41) are actuable in each case by means of an adjusting piston (7, 26), wherein the adjusting pistons (7, 26) of both hydraulic motors (6, 25) are loadable with a force by means of a common high pressure and the common high pressure is equal to the highest working pressure prevailing in the working lines (4, 4', 5, 5') of both hydraulic motors (6, 25), and the force is counteracted in each case by a counterforce, which is generated by an actuating pressure in an actuating pressure chamber (11, 11'), and that the actuating pressure chamber (11) of the first adjusting piston (7) of the first hydraulic motor (6) is relievable through a first pressure regulating valve (17) towards a tank (20) and the first pressure regulating valve (17) is loaded with the in each case higher pressure of the working lines (4, 5) associated with the first hydraulic motor (6) as a controlled variable and the actuating pressure chamber (11') of the second adjusting piston (27) of the second hydraulic motor (25) is relievable through a second pressure regulating valve (30) towards the tank (20) and the second pressure regulating valve (30) is loaded with the in each case higher pressure of the working lines (4', 5') associated with the second hydraulic motor (25) as a controlled variable, and wherein the pressure regulating valves (17, 30) in their initial position establish a connection, through which flow is possible in both directions, of in each case one control pressure valve (19, 29) to in each case on actuating pressure chamber (11, 11').

2. Hydrostatic drive according to claim 1,
characterized in
that the pressure regulating valves (17, 30) are designed as spring-loaded, infinitely variable 3/2-way valves.

3. Hydrostatic piston machine according to claim 1,
characterized in
that, for loading the first and/or second pressure regulating valve (17; 30) with the in each case higher pressure of the working lines (4, 5; 4', 5') of the first and/or second hydraulic motor (6; 25), the first and/or second pressure regulating valve (17, 30) is connected to the working lines (4, 5; 4', 5') of the first and/or second hydraulic motor (6; 25) in each case by a check valve (23*a*, 23*b*, 23*a'*, 23*b'*) opening in the direction of the pressure regulating valves (17, 30).

4. Hydrostatic piston machine according to claim 3,
characterized in
that formed parallel to the check valves (23*a*, 23*b*, 23*a'*, 23*b'*) there is in each case a line having a throttling device (24*a*, 24*b*, 24*a'*, 24*b'*).

5. Hydrostatic drive having at least one hydraulic pump (1) and a first and a second hydraulic motor (6, 25), 5 which are each connected by two working lines (4, 4', 5, 5') to the hydraulic pump (1) and the absorption volume of which is adjustable in each case by means of an adjusting device (40, 41), wherein in each case one hydraulic motor (6, 25) is provided for a drive train for in each case a right or a left vehicle side, characterized in that the adjusting devices (40, 41) are actuable in each case by means of an adjusting piston (7, 26), wherein the adjusting pistons (7, 26) of both hydraulic motors (6, 25) are loadable with a force by means of a common high pressure and the common high pressure is equal to the highest working pressure prevailing in the working lines (4, 4', 5, 5') of both hydraulic motors (6, 25), and the force is counteracted in each case by a counterforce, which is generated by an actuating pressure in an actuating pressure chamber (11, 11 '), and that the actuating pressure chamber (11) of the first adjusting piston (7) of the first hydraulic motor (6) is relievable through a first pressure regulating valve (17) towards a tank (20) and the first pressure regulating valve (17) is loaded with the in each case higher pressure of the working lines (4, 5) associated with the first hydraulic motor (6) as a controlled variable and the actuating pressure chamber (11') of the second adjusting piston (27) of the second hydraulic motor (25) is relievable through a second pressure regulating valve (30) towards the tank (20) and the second pressure regulating valve (30) is loaded with the in each case higher pressure of the working lines (4', 5') associated with the second hydraulic motor (25) as a controlled variable, and wherein the actuating pressures are adjustable in each case by means of a control pressure valve (19; 29).

6. Hydrostatic piston machine according to claim 5,
characterized in
that the setting of the pressure of the control valve (19;29) arises as an equilibrium of forces between a measuring area loaded with a control pressure and at least one oppositely acting compression spring, the spring force of which is fed back by the adjusting piston (7; 26).

* * * * *